US012785327B2

(12) United States Patent
Kobayashi et al.

(10) Patent No.: US 12,785,327 B2
(45) Date of Patent: Nov. 3, 2026

(54) CONNECTOR

(71) Applicant: Yazaki Corporation, Tokyo (JP)

(72) Inventors: Tooru Kobayashi, Shizuoka (JP); Hideki Homma, Tokyo (JP); Kenta Suzuki, Tokyo (JP); Shuya Okano, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 369 days.

(21) Appl. No.: 18/759,295

(22) Filed: Jun. 28, 2024

(65) Prior Publication Data

US 2024/0356268 A1 Oct. 24, 2024

Related U.S. Application Data

(63) Continuation of application No. PCT/JP2023/004888, filed on Feb. 14, 2023.

(30) Foreign Application Priority Data

Feb. 28, 2022 (JP) ................................ 2022-028861

(51) Int. Cl.
*H01R 13/518* (2006.01)
*H01R 13/629* (2006.01)

(52) U.S. Cl.
CPC ..... *H01R 13/62938* (2013.01); *H01R 13/518* (2013.01); *H01R 13/62955* (2013.01)

(58) Field of Classification Search
None
See application file for complete search history.

(56) References Cited

U.S. PATENT DOCUMENTS

| | | | | |
|---|---|---|---|---|
| 6,878,017 | B2 * | 4/2005 | Sakurai | H01R 31/06 439/724 |
| 9,112,293 | B2 * | 8/2015 | Suzuki | H01R 13/4223 |
| 9,391,404 | B2 * | 7/2016 | Shimizu | H01R 13/743 |
| 11,128,084 | B2 * | 9/2021 | Takagi | H01R 13/518 |
| 2014/0127921 | A1 * | 5/2014 | Shimizu | H01R 13/62938 439/157 |
| 2022/0239040 | A1 | 7/2022 | Nozaki et al. | |

FOREIGN PATENT DOCUMENTS

| | | |
|---|---|---|
| JP | 2017-157494 A | 9/2017 |
| JP | 2021-005443 A | 1/2021 |

* cited by examiner

*Primary Examiner* — Ross N Gushi
(74) *Attorney, Agent, or Firm* — Sughrue Mion, PLLC

(57) ABSTRACT

A connector includes a first housing, a second housing and a support member. A first terminal having a first connection section is stored in the first housing. A second terminal having a second connection section is stored in the second housing. The support member is provided with a support wall on which an insertion hole is formed, and. The support wall is movable between a temporary position in which the first connection section is supported thereby and a completion position in which the first connection section is inserted into the second connection section. The support member is provided with a first hood section for storing the first housing and a second hood section for storing the second housing. The support wall is integrally formed with the first hood section and the second hood section and partitions the first hood section and the second hood section.

2 Claims, 9 Drawing Sheets

CONNECTOR

CROSS REFERENCE TO RELATED APPLICATION

The present application is a continuation of International Application No. PCT/JP2023/004888, filed on Feb. 14, 2023, and based upon and claims the benefit of priority from Japanese Patent Application No. 2022-28861, filed on Feb. 28, 2022, the entire contents of which are incorporated herein by reference.

TECHNICAL FIELD

The present disclosure relates to a connector.

BACKGROUND

A connector disclosed in JP2021-5443A includes a first housing in which first terminals each having a tab-shaped first connection section are stored and a second housing in which second terminals each having a box-shaped second connection section into which the first connection section is inserted are stored. The above connector also includes a moving plate as a support member having a support wall with insertion holes through which the first connection sections are inserted.

In the above connector, the first housing is provided with a hood section into which the second housing is inserted inside. The moving plate is movably housed in the hood section. The moving plate moves between a temporary position where the first connection sections of the first terminals are supported and a completion position where the first connection sections are inserted into the second connection sections of the second terminals, respectively. In the above connector, the moving plate supports the tab-shaped first connection sections of the first terminals so that the first connection sections can be stably inserted into the second connection sections of the second terminals, respectively.

SUMMARY OF THE INVENTION

However, in the above connector, it is necessary to form a gap between the hood section of the first housing and the support member in order to allow the support member to move. This gap may cause the support member to rattle when it moves. If rattling of the support member occurs, the supported first connection sections may not be inserted stably into the second connection sections, and thereby electrical connection reliability may be degraded.

An object of the present disclosure is to provide a connector that can maintain electrical connection reliability.

A connector according to the present disclosure includes a first housing for storing a first terminal having a tab-shaped first connection section, a second housing for storing a second terminal having a box-shaped second connection section, into which the first connection section is to be inserted, a support member provided with a support wall on which an insertion hole is formed, into which the first connection section is to be inserted and that is movable between a temporary position in which the first connection section is supported thereby and a completion position in which the first connection section is inserted into the second connection section, and the support member is provided with a first hood section into which the first housing is to be inserted and a second hood section into which the second housing is to be inserted, and the support wall is integrally formed with the first hood section and the second hood section and partitions the first hood section and the second hood section.

According to the connector, provided can be the connector that can maintain electrical connection reliability.

DETAILED DESCRIPTION OF THE INVENTION

Figure 1:
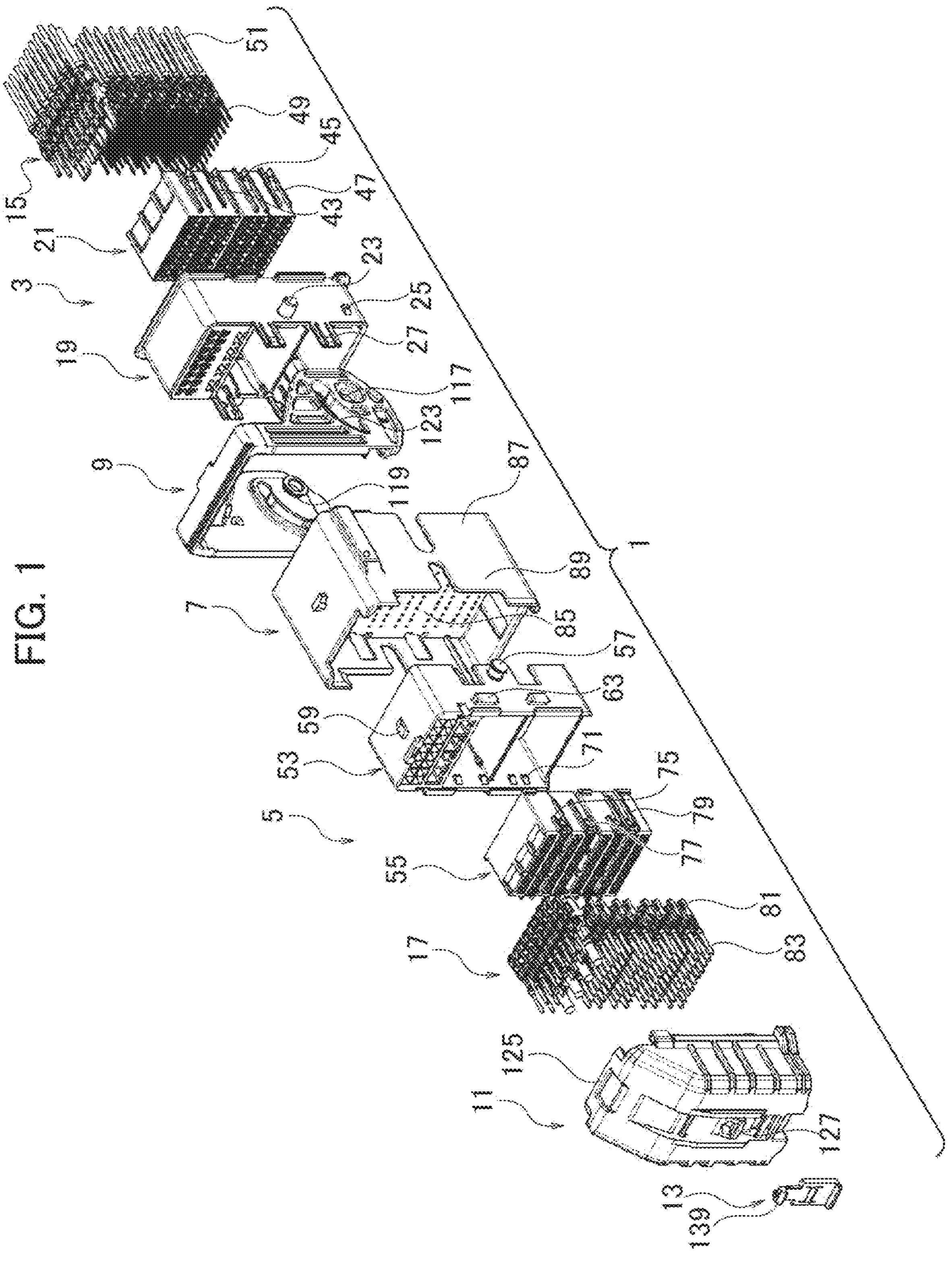
FIG. 1 is an exploded perspective view of a connector according to an embodiment.
Figure 2:
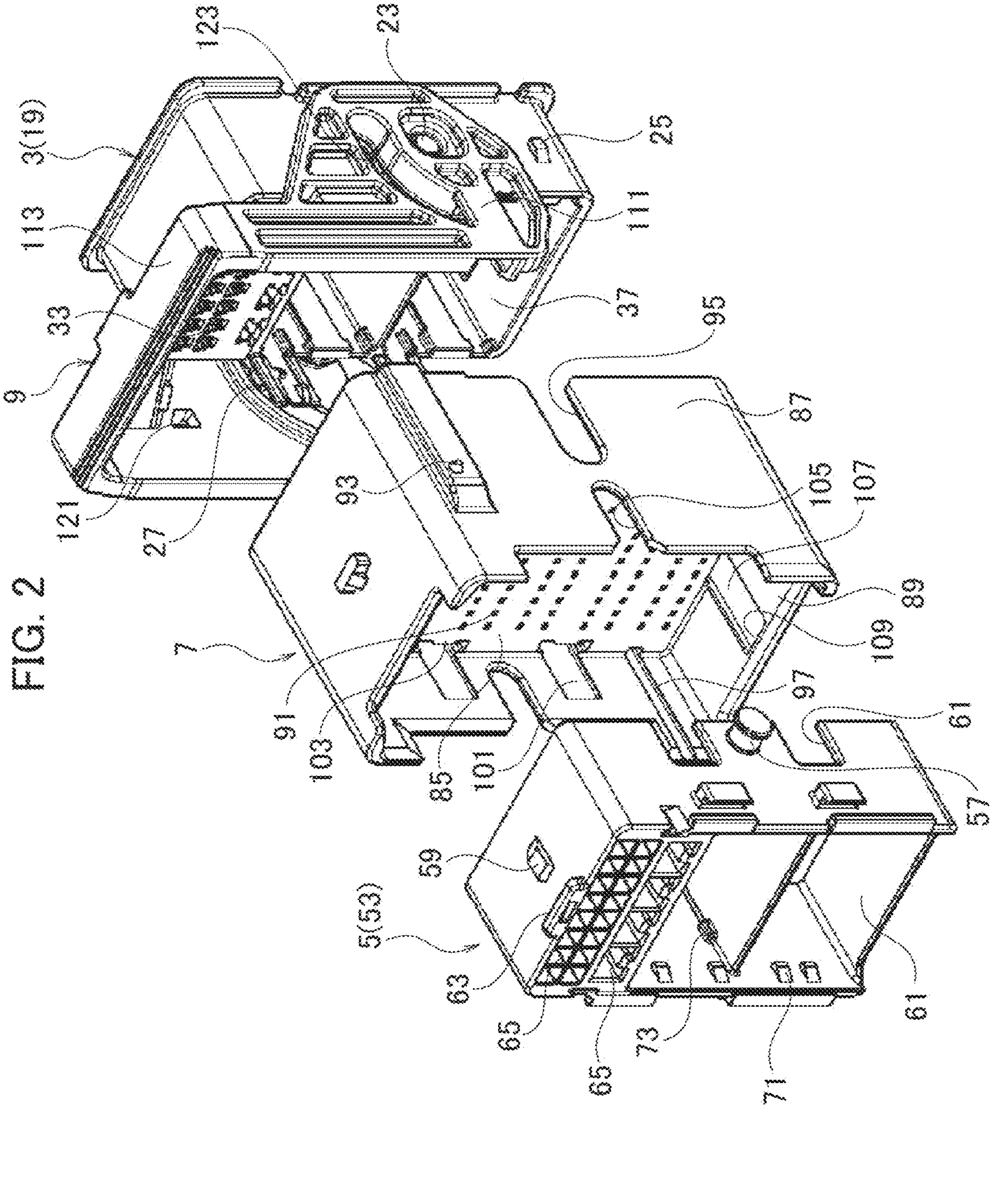
FIG. 2 is an exploded perspective view illustrating a first housing, a second housing, a support member and a lever of the connector.

Hereinafter, a connector according to an embodiment will be described with reference to the drawings.

As shown in FIG. 1 to FIG. 11, the connector 1 according to the present embodiment includes a first housing 3, a second housing 5, a support member 7, a lever 9, a cover 11, and a detection member 13. The first housing 3 stores first terminals 15. The second housing 5 stores second terminals 17. The first housing 3 and the second housing 5 are positioned close together by rotation of the lever 9 with the support member 7 interposed therebetween, and thereby the first terminals 15 and the second terminals 17 are electrically connected.

As shown in FIG. 1 to FIG. 10, the first housing 3 includes a first frame 19 and first sub-housings 21.

The first frame 19 is formed of an insulating material such as, for example, synthetic resin. The first frame 19 is formed to have a box shape. From outer surfaces of both side walls of the first frame 19, axial shafts 23 that rotatably support the lever 9 project outwardly, respectively. Beneath the axial shafts 23 on the outer surfaces of both side walls of the first frame 19, first engaging protrusions 25 protrude outward, respectively. Each face of the first engaging protrusions 25 facing to the support member 7 is formed as a sloped surface, and each face of the first engaging protrusion 25 opposite to the support member 7 is an engagement surface formed as a flat surface perpendicular to the outer surface of the first frame 19.

On end edges of both side walls of the first frame 19 facing to the support member 7, plural (four in the present embodiment) elastically-deformable elastic tabs 27 that are extended toward the support member 7 are provided. A front protrusion 29 and a rear protrusion 31 that protrude toward the inside of the first frame 19 are formed on each inner face of the elastic tabs 27. Each of the front protrusions 29 has sloped surfaces that slope from its top to its both sides, respectively. Each surface of the rear protrusions 31 facing to the front protrusion 29 is an engagement surface formed as a flat surface perpendicular to the extending direction of the elastic tabs 27. The front protrusion 29 and the rear protrusion 31 are spaced apart so that a support wall 85 of the support member 7 can be held between them.

Plural first terminal storage chambers 33 capable of storing the first terminals 15 are formed at an upper portion of the first frame 19. Ends of the first terminal storage chambers 33 on a far side of the support member 7 are open to allow insertion of the first terminals 15 therein. In addition, ends of the first terminal storage chambers 33 on a near side of the support member 7 are open to expose tab-shaped first connection sections 49 of the first terminals 15 to the outside. In each inside of the first terminal storage chambers 33, provided is an elastically-deformable first engagement lance 35 that is engaged with the first terminal 15 and holds the first terminal 15 in the first terminal storage chamber 33.

Plural (two in the present embodiment) first storage spaces 37 are formed at a lower portion of the first frame 19. Plural first sub-locked portions 39 are protruded inward from inner faces, on a far side of the support member 7, of each of the first storage spaces 37. Plural first push-out stoppers 41 are protruded inward from the inner faces, on a near side of the support member 7, of each of the first storage spaces 37. The first sub-housings 21 are stored in the first storage spaces 37.

The first sub-housing(s) 21 is formed of an insulating material such as, for example, synthetic resin. The first sub-housing 21 is formed to have a box shape that can be stored in the first storage space 37. In the present embodiment, the two first sub-housings 21 are stored in each of the first storage spaces 37. Elastically-deformable first elastic arms 43 are provided on outer faces, on a far side of the support member 7, of each of the first sub-housings 21. At each free end of the first elastic arms 43, a first sub-locking portion 45 capable of engaging the first sub-locked portion 39 of the first frame 19 is protruded outward. First protective walls 47 are provided on both sides of each of the first elastic arms 43 to extend along the length direction of the first elastic arms 43. Each of the first protective walls 47 is protruded outward from the outer face of the first sub-housing 21.

The first sub-housing(s) 21 is inserted into the first storage space 37 through the opening on a far side of the support member 7 and then stored therein. When the first sub-housing 21 is stored in the first storage space 37, the first sub-locked portions 39 and the first sub-locking portions 45 are engaged with each other to prevent the first sub-housing 21 from being pulled out of the first storage space 37. In addition, when the first sub-housing 21 is stored in the first storage space 37, the first push-out stoppers 41 and end faces of the first protective walls 47 contact with each other to prevent the first sub-housing 21 from being pushed out of the first storage space 37.

The plural first terminal storage chambers 33 capable of storing the first terminals 15, respectively, are provided in each inside of the first sub-housings 21. Ends of the first terminal storage chambers 33 on a far side of the support member 7 are open to allow insertion of the first terminals 15 therein. In addition, ends of the first terminal storage chambers 33 on a near side of the support member 7 are open to expose the tab-shaped first connection sections 49 of the first terminals 15 to the outside. In each inside of the first terminal storage chambers 33, provided is the elastically-deformable first engagement lance 35 that is engaged with the first terminal 15 and holds the first terminal 15 in the first terminal storage chamber 33.

As shown in FIG. 1, FIG. 3, FIG. 4, FIG. 6 and FIG. 7, the first terminal(s) 15 is made of conductive material. The first terminal 15 is a male terminal having the tab-shaped first connection section 49 extending toward the support member 7. The first connection section 49 extends outward from the opening of the first terminal storage chamber 33 on a near side of the support member 7 and is exposed to the outside. The first terminal 15 is electrically connected to an end of a first wire 51 electrically connected to a power source, an equipment or the like.

The first terminal 15 electrically connected to the end of the first wire 51 is stored in the first terminal storage chamber 33 through the opening on a far side of the support member 7. The tab-shaped first connection sections 49 of the first terminals 15 stored in the first terminal storage chambers 33 are exposed to the outside through the openings of the first terminal storage chambers 33 on a near side of the support member 7, respectively. The first wires 51 are drawn out from the openings, on a far side of the support member 7, of the first terminal storage chambers 33 in which the first terminals 15 are stored, respectively.

As shown in FIG. 1 through FIG. 6, the second housing 5 includes a second frame 53 and a second sub-housing 55.

The second frame 53 is formed of an insulating material such as, for example, synthetic resin. The second frame 53 is formed to have a box shape that is slightly lower in height than the first frame 19. Cam pins 57 project outwardly from outer surfaces of both side walls of the second frame 53. Second engaging protrusions 59 protrude outwardly from the outer surfaces of upper and lower walls of the second frame 53, respectively. Each face of the second engaging protrusions 59 facing to the support member 7 is formed as a sloped surface, and each face of the second engaging protrusions 59 opposite to the support member 7 is an engagement surface formed as a flat surface perpendicular to the outer surface of the second frame 53.

On end edges of both sides of the second frame 53 facing to the support member 7, plural (four in the present embodiment) insertion slits 61 into which the elastic tabs 27 of the first frame 19 can be inserted, respectively, are provided. Plural cover engaged portions 63 protrude outward from the outer surfaces of the second frame 53 on a far side of the support member 7, respectively.

Plural second terminal storage chambers 65 capable of storing the second terminals 17 are formed at an upper portion of the second frame 53. Ends of the second terminal storage chambers 65 on a far side of the support member 7 are open to allow insertion of the second terminals 17 therein. In addition, ends of the second terminal storage chamber 65 on a near side of the support member 7 are open to allow insertion of the tab-shaped first connection sections

49 of the first terminals 15. In each inside of the second terminal storage chambers 65, provided is an elastically-deformable second engagement lance 67 that is engaged with the second terminal 17 and holds the second terminal 17 in the second terminal storage chamber 65.

Plural (two in the present embodiment) second storage spaces 69 are formed at a lower portion of the second frame 53. Plural second sub-locked portions 71 are protruded inward from inner faces, on a far side of the support member 7, of the second storage space 69. Plural second push-out stoppers 73 are protruded inwardly from the inner faces, on a near side of the support member 7, of the second storage space 69. The second sub-housings 55 are stored in the second storage spaces 69.

The second sub-housing(s) 55 is formed of an insulating material such as, for example, synthetic resin. The second sub-housing 55 is formed to have a box shape that can be stored in the second storage space 69. In the present embodiment, the two second sub-housings 55 are stored in each of the second storage spaces 69. Elastically-deformable second elastic arms 75 are provided on the outer faces, on a far side of the support member 7, of the second sub-housing 55. At each free end of the second elastic arms 75, a second sub-locking portion 77 capable of engaging the second sub-locking portion 71 of the second frame 53 is protruded outward. Second protective walls 79 are provided on both sides of each of the second elastic arms 75 to extend along the length direction of the second elastic arms 75. Each of the second protective walls 79 is protruded outward from the outer face of the second sub-housing 55.

The second sub-housing(s) 55 is inserted into the second storage space 69 through the opening on a far side of the support member 7 and then stored therein. When the second sub-housing 55 is stored in the second storage space 69, the second sub-locked portions 71 and the second sub-locking portions 77 are engaged with each other to prevent the second sub-housing 55 from being pulled out of the second storage space 69. In addition, when the second sub-housing 55 is stored in the second storage space 69, the second push-out stoppers 73 and end faces of the second protective walls 79 contact with each other to prevent the second sub-housing 55 from being pushed out of the second storage space 69.

The plural second terminal storage chambers 65 capable of storing the second terminals 17, respectively, are provided in each inside of the second sub-housings 55. Ends of the second terminal storage chambers 65 on a far side of the support member 7 are open to allow insertion of the second terminals 17 therein. In addition, ends of the second terminal storage chambers 65 on a near side of the support member 7 are open to allow insertion of the tab-shaped first connection sections 49 of the first terminals 15 therein. In each inside of the second terminal storage chambers 65, provided is an elastically-deformable second engagement lance 67 that is engaged with the second terminal 17 and holds the second terminal 17 in the second terminal storage chamber 65.

As shown in FIG. 1, FIG. 3, FIG. 4 and FIG. 6, the second terminal(s) 17 is made of conductive material. The second terminal 17 is a female terminal having the box-shaped second connection section 81 into which the tab-shaped first connection section 49 of the first terminal 15 can be inserted. The second terminal 17 is extended in the second terminal storage chamber 65 toward the support member 7. The second terminal 17 is electrically connected to an end of a second wire 83 electrically connected to a power source, an equipment or the like.

The second terminal 17 electrically connected to the end is stored in the second terminal storage chamber 65 through the opening on a far side of the support member 7. The box-shaped second connection sections 81 of the second terminals 17 stored in the second terminal storage chambers 65 are positioned in line with the openings of the second terminal storage chambers 65 on a far side of the support member 7, respectively. The second wires 83 are drawn out from the openings, on a far side of the support member 7, of the second terminal storage chambers 65 in which the second terminals 17 are stored, respectively.

As shown in FIG. 1 through FIG. 9 and FIG. 11, the support member 7 is made of an insulating material such as, for example, synthetic resin. The support member 7 includes a support wall 85, a first hood section 87, and a second hood section 89.

The support wall 85 is formed to have a flat-plate shape. The support wall 85 is disposed between the first housing 3 and the second housing 5. The support wall 85 is in contact with the first housing 3 and the second housing 5 when the first terminals 15 and the second terminals 17 are electrically connected. Plural insertion holes 91 through which the tab-shaped first connection sections 49 of the first terminals 15 are inserted, respectively, are formed on the support wall 85. The plural insertion holes 91 are located in line with the openings of the plural second terminal storage chambers 65, respectively.

In a temporary position of the support wall 85 (see FIG. 7), tips of the tab-shaped first connection sections 49 are inserted into the insertion holes 91, respectively, and then supported by them. In a completion position of the support wall 85 (see FIG. 6), the tab-shaped first connection sections 49 exposed from the insertion holes 91 are inserted into the box-shaped second connection sections 81 of the second terminals 17, respectively. The support wall 85 is movable between the temporary position and the completion position while being interposed between the first housing 3 and the second housing 5. In the present embodiment, the support wall 85 contacts the second housing 5 in the temporary position and moves together with the second housing 5 from the temporary position to the completion position.

The support wall 85 keeps positions of the tab-shaped first connection sections 49 with respect to the box-shaped second connection sections 81 until it moves from the temporary position to the completion position. Therefore, the tab-shaped first connection sections 49 are inserted stably into the box-shaped second connection sections 81, respectively, and thereby the electrical connection reliability between the first terminals 15 and the second terminals 17 can be maintained.

The first hood section 87 is a member continued from the support wall 85 and extended toward the first housing 3. The first hood section 87 is formed to have a box shape that can store the first housing 3 therein. From outer surfaces of both side walls of the first hood section 87, lever protrusions 93 protrude outward, respectively. From each end edge of both side walls of the first hood section 87 facing to the first housing 3, lever slits 95 are formed, respectively.

On inner surfaces of both side walls of the first hood section 87, first grooves 97 are formed, respectively. The first groove(s) 97 is formed from the first hood section 87 to the second hood section 89. A through hole is thus formed at a portion of the support wall 85 corresponding to the first groove 97. A first engaged portion 99, with which the engagement surface of the first engaging protrusion 25 of the first housing 3 is engaged, is formed at an end of the first groove 97 on a near side of the first housing 3. The engagement between the first engaging protrusion 25 and the first engaged portion 99 prevents the first housing 3 from being pulled out of the first hood section 87.

An end of the first groove 97 on a near side of the second housing 5 is open. Here, in order to form a groove, whose both ends are closed (by the first engaged portion 99 or the like), within the support member 7, structure of a molding die for the support member 7 would be complicated, or a post-process like a cutting work would be required after forming the support member 7. If the one end of the first groove 97 is opened as in the present embodiment, a portion of the molding die that molds the first groove 97 can be pulled out in one direction when the molding die for the support member 7 is opened. As a result, the structure of the molding die can be simplified and no cutting work nor no post-process is required. In other words, the moldability of the support member 7 can be improved by opening the end of the first groove 97 on a near side of the second housing 5.

On inner surfaces of both side walls of the first hood section 87, acceptance grooves 101 corresponding to the elastic tabs 27 of the first housing 3 are formed respectively. The acceptance groove(s) 101 is formed from the first hood section 87 to the second hood section 89. An engagement hole 103 is thus formed at a portion of the support wall 85 corresponding to the acceptance groove 101. An end of the acceptance groove 101 on a near side of the second housing 5 is closed and another end on a near side of the first housing 3 is open. Therefore, the moldability of the support member 7 can be improved.

When the first housing 3 is stored in the first hood section 87, the elastic tabs 27 are accommodated in the acceptance grooves 101, respectively. A gap is formed between the bottom of the acceptance groove(s) 101 and the elastic tab(s) 27 to allow elastic deformation of the elastic tab(s) 27. An inner edge of the engagement hole 103 of the support wall 85 is engaged between the front protrusion 29 and the rear protrusion 31 of the elastic tab 27 in the acceptance groove 101 (see FIG. 9). With the engagement of the engagement holes 103 and the elastic tabs 27 (the front protrusions 29 and the rear protrusions 31), the first housing 3 is not further inserted with respect to the first hood section 87, and the support wall 85 and the first housing 3 are distanced from each other. In the distanced state of the support wall 85 and the first housing 3, the tips of the tab-shaped first connection sections 49 are inserted into the insertion holes 91 of the support wall 85, respectively. Therefore, the support wall 85 is held in the temporary position while the elastic tabs 27 are engaged with the engagement holes 103.

The second hood section 89 is a member continued from the support wall 85 and extended toward the second housing 5. The second hood section 89 is formed to have a box shape that can store the second housing 5 therein. An interior height of the second hood section 89 is slightly lower than an interior height of the first hood section 87. From each end edge of both side walls of the second hood section 89 facing to the second housing 5, pin slits 105, into each of which a cam pin 57 of the second housing 5 can be inserted, are formed, respectively. When the second housing 5 is stored in the second hood section 89, the cam pins 57 of the second housing 5 are held inside the pin slits 105, respectively, and tips of the cam pins 57 protrudes from the outer surfaces of the support member 7, respectively.

On inner surfaces of upper and lower walls of the second hood section 89, second grooves 107 are formed, respectively. The second groove(s) 107 is formed from the first hood section 87 to the second hood section 89. A through hole is thus formed at a portion of the support wall 85 corresponding to the second groove 107, and an end of the second groove 107 on a near side of the first housing 3 is open. Therefore, the moldability of the support member 7 can be improved.

A second engaged portion 109, with which the engagement surface of the second engaging protrusion 59 of the second housing 5 is engaged, is formed at an end of the second groove 107 on a near side of the second housing 5. The engagement between the second engaging protrusion 59 and the second engaged portion 109 prevents the second housing 5 from being pulled out of the second hood section 89. When the second engaging protrusions 59 and the second engaged portions 109 are engaged, the second housing 5 is in contact with the support wall 85 (see FIG. 3 and FIG. 6). In addition, the openings of the second terminal storage chambers 65 on a near side of the support member 7 are positioned in line with the insertion holes 91 formed on the support wall 85, respectively. Therefore, when the support wall 85 is moved from the temporary position to the completion position, the second housing 5 relatively moves toward the first housing 3 together with the support wall 85.

With the first housing 3 stored in the first hood section 87 so that the support wall 85 is in the temporary position, the second housing 5 is stored in the second hood section 89. When the second housing 5 contacts the support wall 85, the second housing 5 contacts the front protrusions 29 of the elastic tabs 27 that have entered the second hood section 89 through the engagement holes 103 of the support wall 85. When the second housing 5 contacts the front protrusions 29, the elastic tabs 27 are elastically deformed within the acceptance grooves 101 (see FIG. 4). When the elastic tabs 27 are elastically deformed, the engagement between the rear protrusions 31 and the engagement holes 103 are disengaged and the support wall 85 can move from the temporary position to the completion position. When the support wall 85 moves to the completion position, the tab-shaped first connection sections 49 are inserted into the box-shaped second connection sections 81, and the first terminals 15 and the second terminals 17 are electrically connected. The movement of the support wall 85 from the temporary position to the completion position is made by the lever 9.

As shown in FIG. 1 through FIG. 6, FIG. 8 and FIG. 9, the lever 9 is formed of an insulating material such as, for example, synthetic resin. The lever 9 has a pair of side walls 111, 111 facing both side walls of the support member 7, respectively, and a connecting portion 113 connecting the pair of side walls 111, 111. The connecting portion 113 of the lever 9 has a lever locking portion 115 (see FIG. 3 and FIG. 6). Shaft holes 117, into which the axial shafts 23 of the first housing 3 are respectively inserted, are formed on the pair of side walls 111,111 of the lever 9, respectively. A hollow cylindrical portion 119 protrudes from each inner surface of the pair of side walls 111, 111 toward the first housing 3. The shaft hole(s) 117 is formed in the center of the hollow cylindrical portion 119. When the axial shafts 23 are inserted into the shaft holes 117, the lever 9 is assembled in the first housing 3 in a rotatable manner about the shaft holes 117. The pair of side walls 111, 111 of the lever 9 are each provided with an engagement hole 121 that engages with the lever protrusion 93 of the support member 7 (see FIG. 5). A cam groove 123, which engages with the cam pin 57 of the second housing 5, is formed respectively in the pair of side walls 111, 111 of the lever 9 along the rotational path of the lever 9.

When the first housing 3 with the lever 9 assembled is inserted into the first hood section 87, the hollow cylindrical portions 119 are inserted into the lever slits 95, respectively, and the lever 9 become rotatable with respect to the support member 7. The lever 9 is held in its rotational initial position by the engagement of the lever protrusions 93 and the engagement holes 121. In the rotational initial position of the lever 9, the openings of the cam grooves 123 face to the second housing 5.

When the second housing 5 is stored in the second hood section 89 in the rotational initial position of lever 9, the cam pins 57 of the second housing 5 are inserted into the cam grooves 123, respectively. When the lever 9 is rotated from the rotational initial position (see FIG. 5), the cam pins 57 move along the cam grooves 123 and the second housing 5 and the support member 7 are moved toward first housing 3. Due to the above-mentioned movement of the second housing 5 and the support member 7, the tab-shaped first connection sections 49 are inserted into the box-shaped second connection sections 81, respectively, and thereby the first terminals 15 and the second terminals 17 electrically connected with each other, respectively. When the lever 9 reaches its rotational completion position, the lever 9 is held in the rotational completion position by the cover 11.

As shown in FIG. 1 and FIG. 3 to FIG. 6, the cover 11 is formed of an insulating material such as, for example, synthetic resin. The cover 11 is formed to have a box shape so as to cover the plural second wires 83 drawn out from the second housing 5. Plural cover engaging portions 125 are formed on the outer surfaces of the cover 11, each of which can engage the plural cover engaged portions 63 of the second housing 5, respectively. The cover 11 is assembled to the second housing 5 by the engagements of the cover engaged portions 63 and the cover engaging portions 125.

An elastically-deformable detection arm 127 is formed on an outer surface of the cover 11 on its opposite surface to the second housing 5. At a free end of the detection arm 127, a lever locked portion 129 is formed that can engage the lever locking portion 115 of the lever 9 (see FIG. 3). The lever locked portion 129 engages with the lever locking portion 115 in the rotational completion position of the lever 9. The engagement of the lever locking portion 115 and the lever locked portion 129 holds the lever 9 in the rotational completion position. A detection hole 131 is formed in a free end of the detection arm 127. The detection hole 131 is a through hole. Below the free end of the detection arm 127 of the cover 11, a detection temporary-engagement portion 133 and a detection engagement-completion portion 135 are formed. The detection member 13 is assembled to the portion where the detection temporary-engagement portion 133 and the detection engagement-completion portion 135 are formed.

Figure 3:
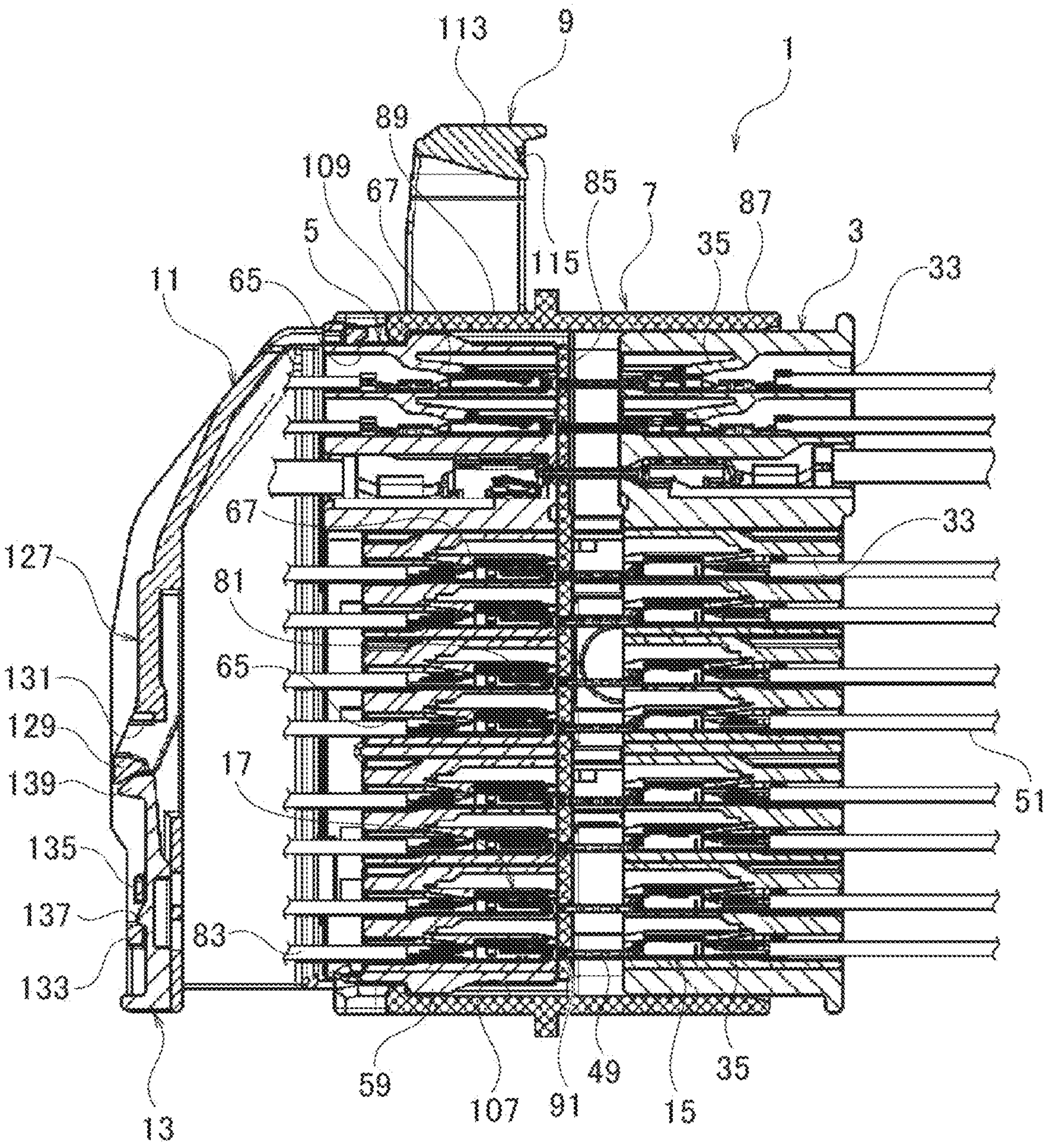
FIG. 3 is a vertical cross-sectional view illustrating a state where a support wall of the connector is in its temporary position (engagement of a second engaging protrusion and a second engaged portion)
Figure 4:
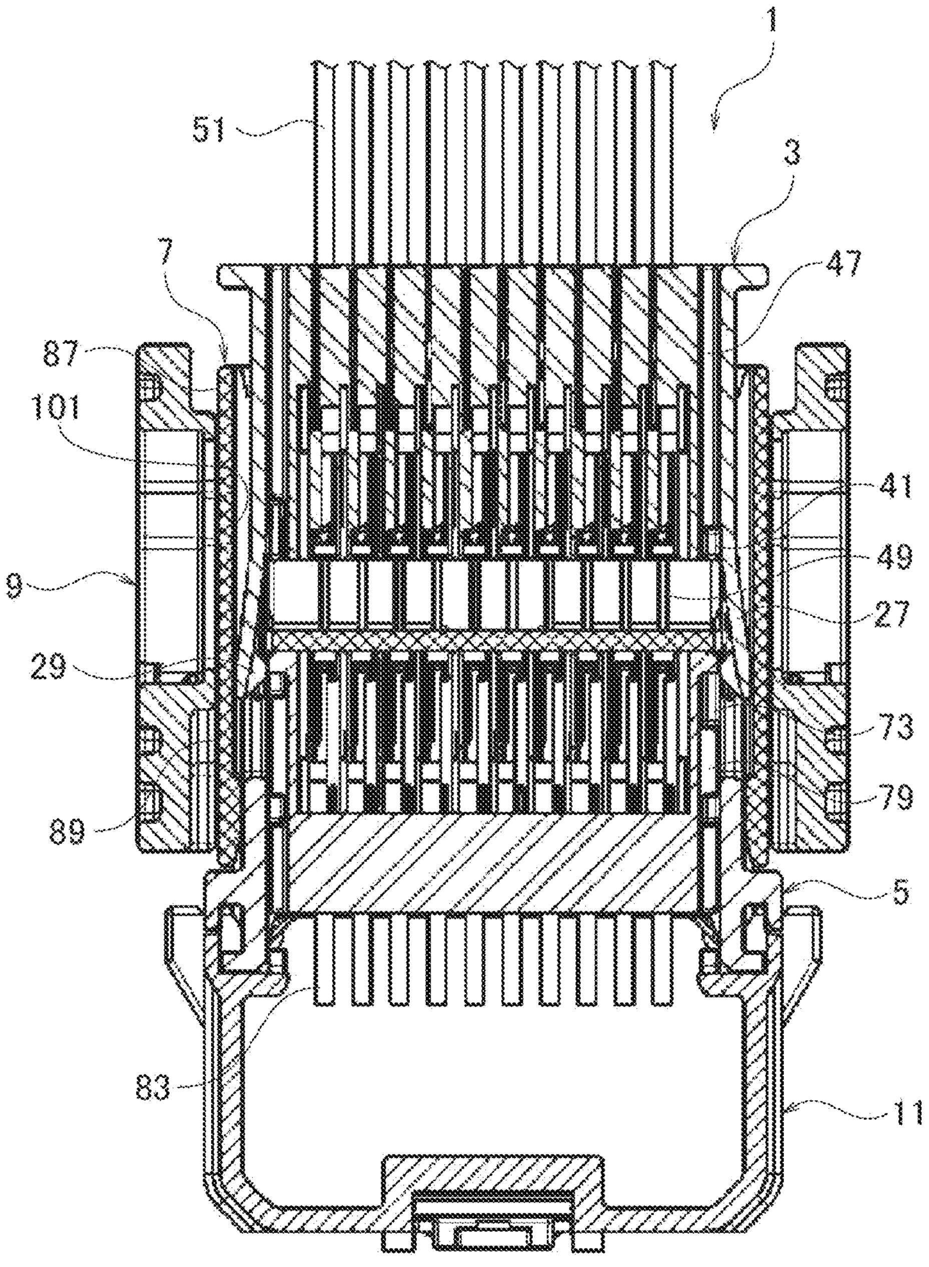
FIG. 4 is a horizontal cross-sectional view of illustrating the state where the support wall of the connector is in the temporary position (disengagement of elastic tabs and engagement holes)
Figure 5:
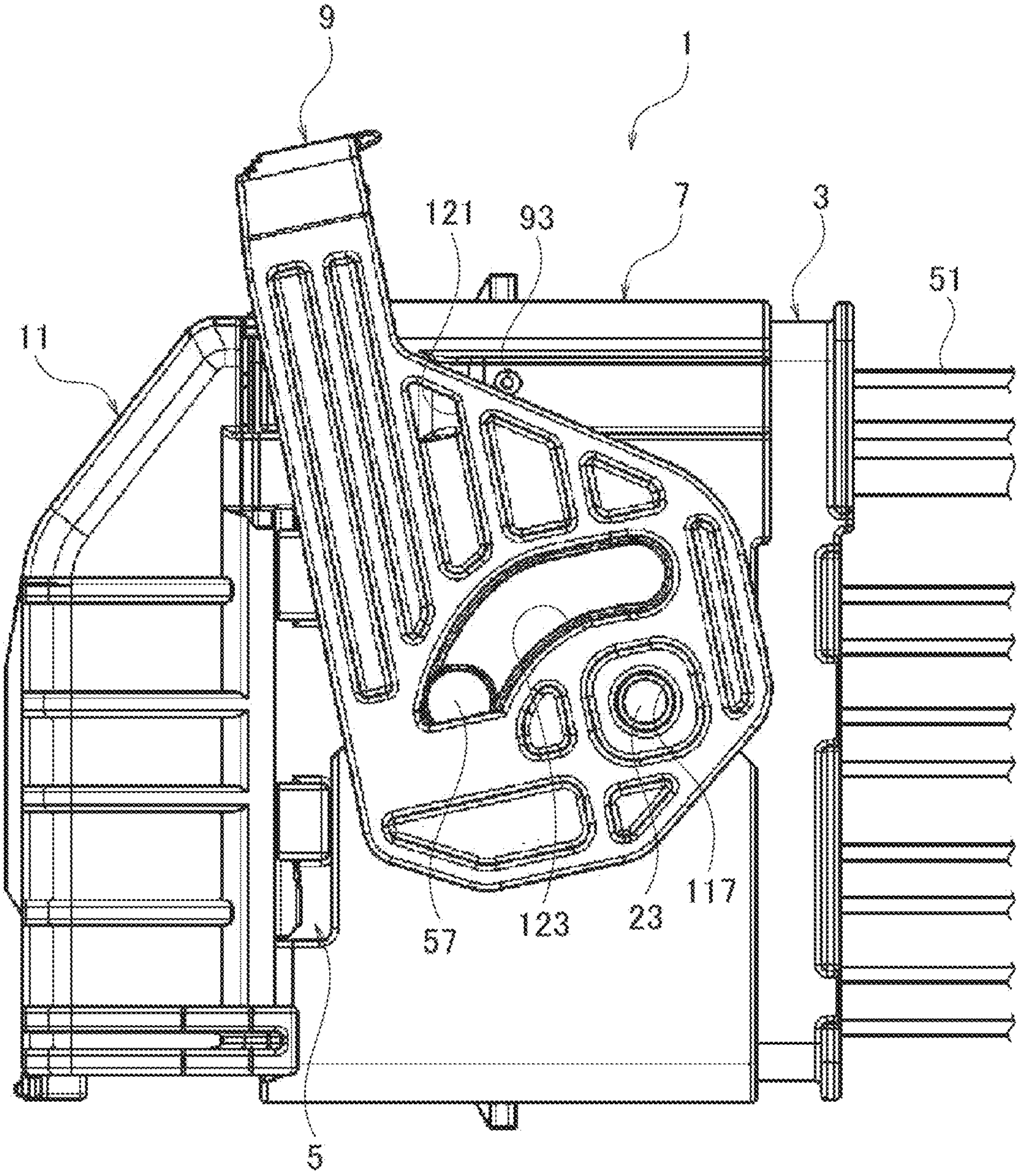
FIG. 5 is a side view illustrating a state where a lever of the connector is rotated from its rotational initial position.
Figure 6:
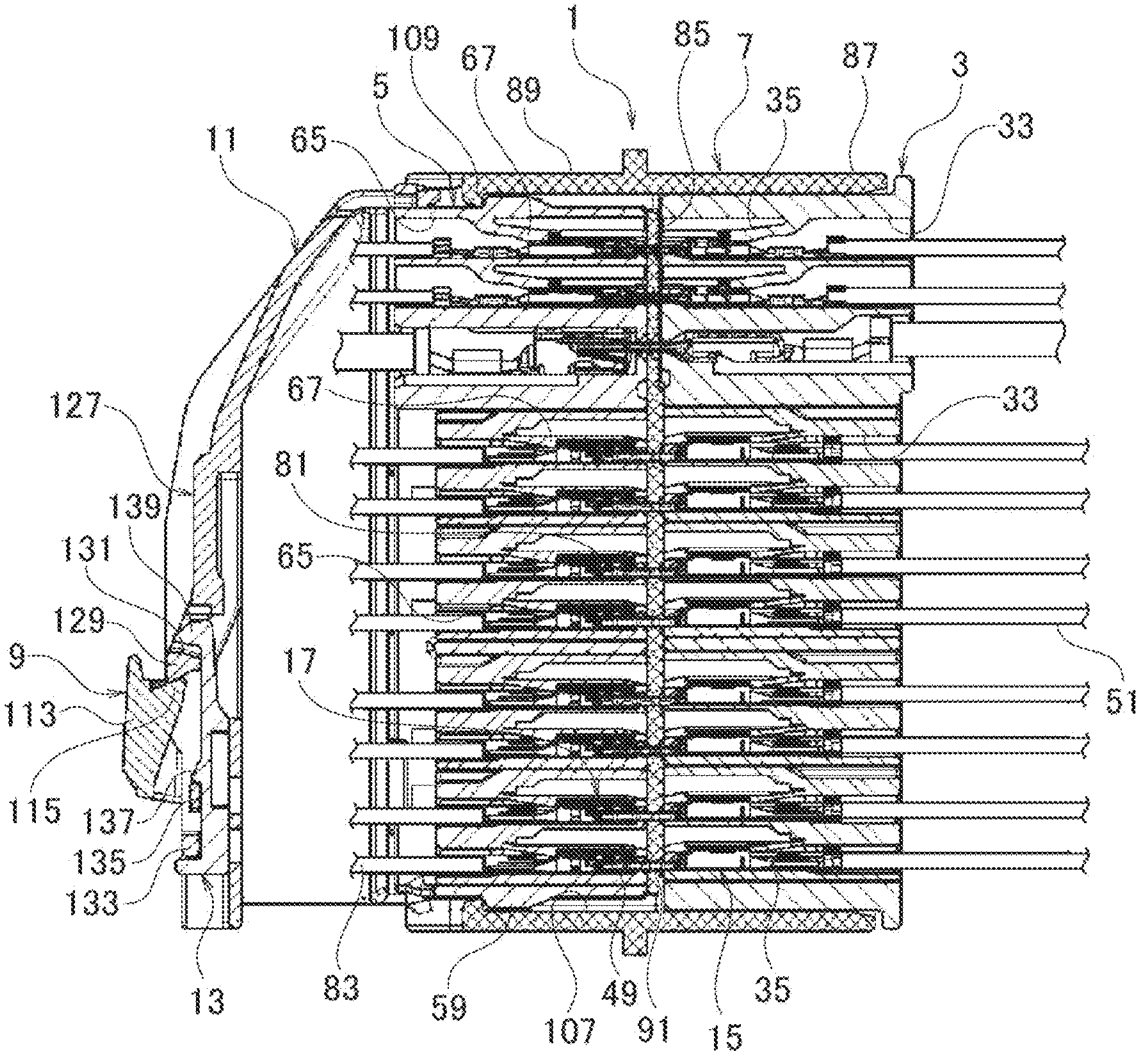
FIG. 6 is a vertical cross-sectional view illustrating a state where the support wall of the connector is in its completion position (the engagement of the second engaging protrusion and the second engaged portion)
Figure 7:
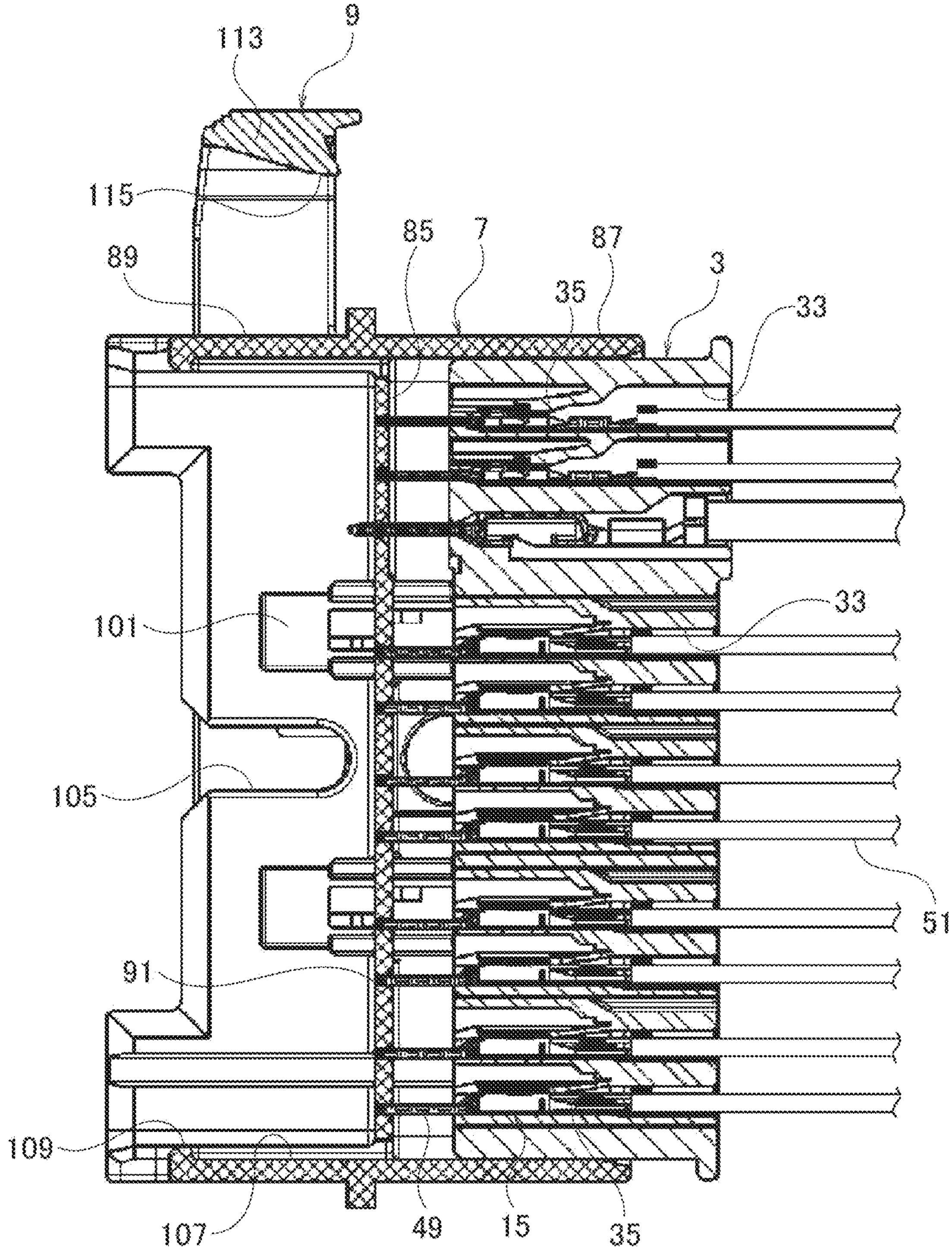
FIG. 7 is a vertical cross-sectional view illustrating a state where the first housing is assembled to a support member (engagement of the elastic tabs and the engagement holes)
Figure 8:
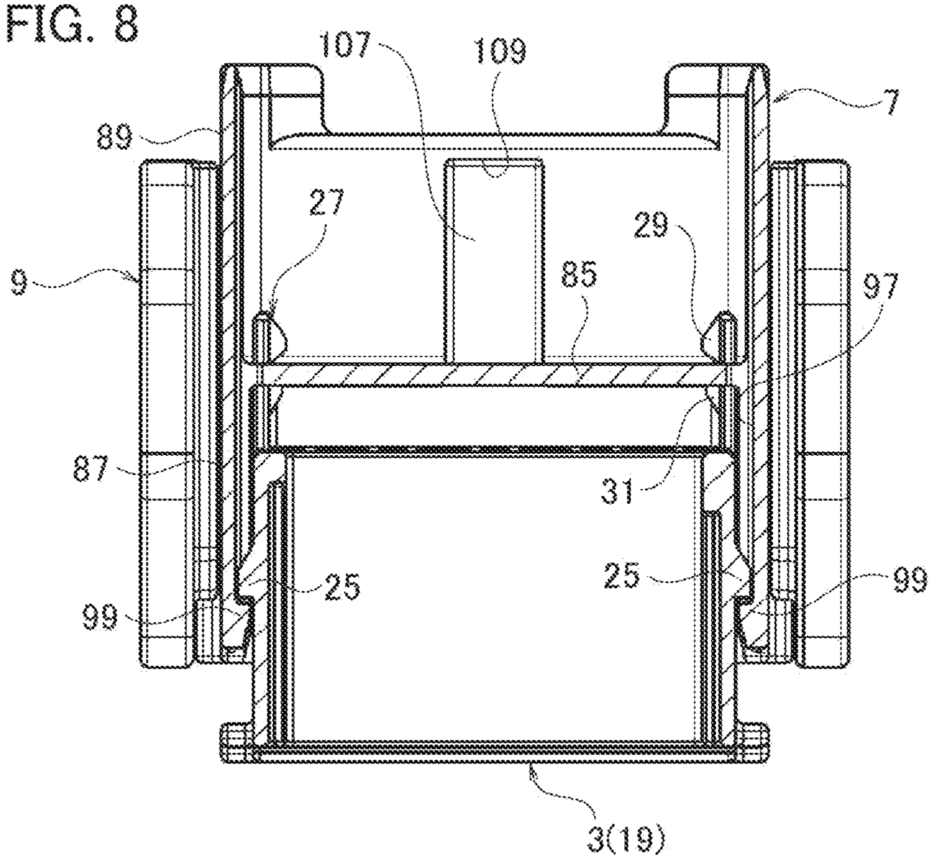
FIG. 8 is a horizontal cross-sectional view illustrating the state where the first housing is assembled to the support member (engagement of first engaging protrusions and first engaged portions)
Figure 9:
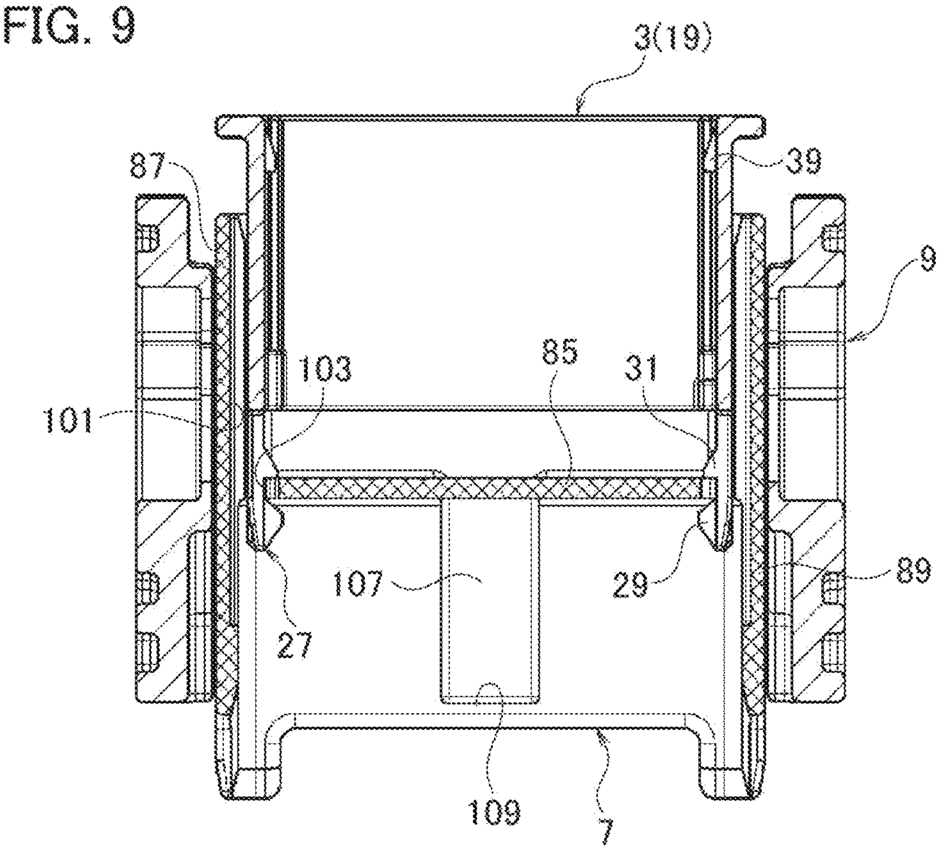
FIG. 9 is a horizontal cross-sectional view illustrating a state where the first housing assembled to the support member (the engagement of the elastic tabs and engagement holes)
Figure 10:
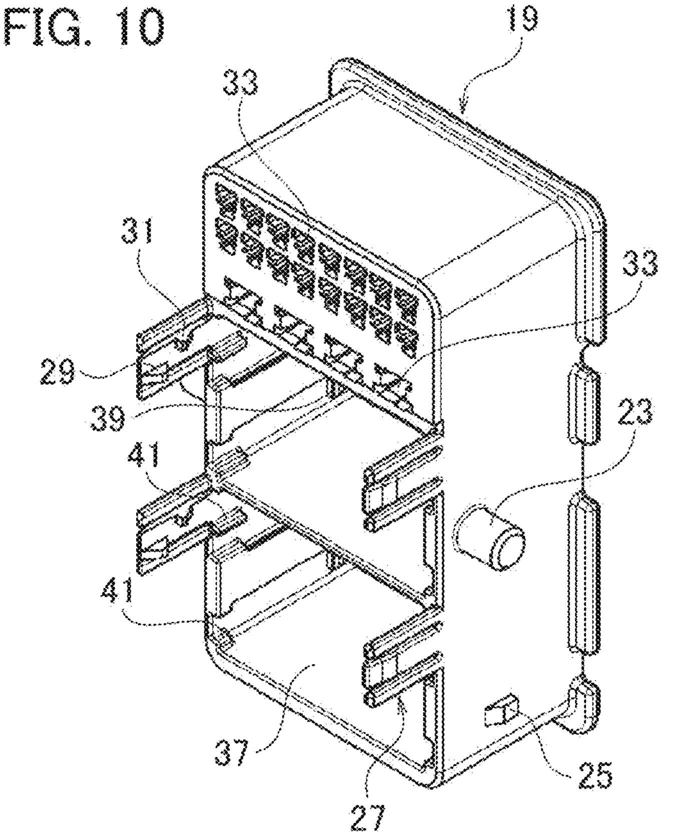
FIG. 10 is a perspective view of a first frame of the connector.
Figure 11:
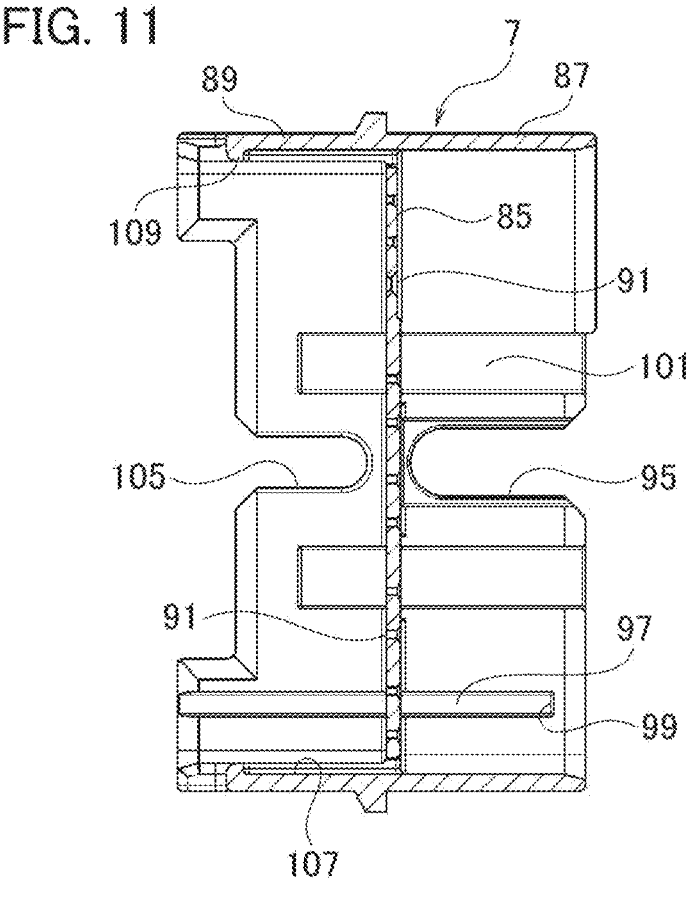
FIG. 11 is a vertical cross-sectional view of the support member of the connector.

As shown in FIG. 1, FIG. 3 and FIG. 6, the detection member 13 is formed of an insulating material such as synthetic resin. The detection member 13 is formed to have a rectangular shape so that it can be accommodated in its assembly space. The detection member 13 is movable in the height direction of the cover 11 with respect to the assembly space. A detection engagement protrusion 137, which can be engaged with the detection temporary-engagement portion 133 or the detection engagement-completion portion 135 of the cover 11, protrudes from the outer surface of the detection member 13. The engagement of the detection engagement protrusion 137 with the detection temporary-engagement portion 133 keeps the detection member 13 in its temporary-engagement position (see FIG. 3). On the other hand, the engagement of the detection engagement protrusion 137 with the detection engagement-completion portion 135 keeps the detection member 13 in its engagement-completion position (see FIG. 6).

A detection portion 139 protruding outward is formed at an end of the detection member 13. When the detection member 13 is in the temporary-engagement position, the detection portion 139 is in contact with the lever locked portion 129. When the detection member 13 is moved from the temporary-engagement position to the engagement-completion position, the detection portion 139 overcomes the lever locked portion 129 and then enters into the detection hole 131. While the detection member 13 is in the engagement-completion position, the detection portion 139 is located within the detection hole 131.

The detection member 13 is held in the temporary-engagement position when assembled to the cover 11, and is moved from the temporary-engagement position to the engagement-completion position after the lever 9 has completed its rotation. When the lever 9 has reached the rotational completion position, the lever locked portion 129 and the lever locking portion 115 are engaged with each other. In this state, the lever locking portion 115 and the detection portion 139 in the temporary-engagement position contact each other, and the detection member 13 is elastically deformed toward the cover 11 (inward). While the detection member 13 is elastically deformed, there is less contact margin between the lever locked portion 129 and the detection portion 139, so it is easier to move the detection member 13 from the temporary-engagement position to the engagement-completion position. At this time, the detection portion 139 overcomes the lever locked portion 129, and the detection member 13 reaches the engagement-completion position. While the detection member 13 is located in the engagement-completion position, it can be detected that the lever 9 is placed in the rotational completion position and that the first terminals 15 and the second terminals 17 are electrically connected, respectively.

If the rotation of the lever 9 to the rotational completion position is insufficient, the lever locking portion 115 is positioned outside of the lever locked portion 129. In this state, the lever locking portion 115 does not contact the detection portion 139 in the temporary-engagement position, and the detection member 13 is not elastically deformed inward. Therefore, even if one tries to move the detection member 13 from the temporary-engagement position to the engagement-completion position, the detection member 13 cannot be moved because the detection portion 139 is in contact with the lever locked portion 129. In other words, since the detection member 13 is not placed in the engagement-completion position, it can be detected that the lever 9 is not located in the rotational completion position and the first terminals 15 and the second terminals 17 may not be electrically connected.

To assemble the connector 1, the lever 9 is assembled into the first housing 3 at first by inserting the axial shafts 23 into the shaft holes 117, respectively. Next, the first housing 3 is inserted into the first hood section 87 of the support member 7. At this time, the first engaging protrusions 25 and the first engaged portions 99 are engaged, respectively, and the elastic tabs 27 are engaged with the engagement holes 103, respectively, so that the support wall 85 is placed in the temporary position to support the tips of the tab-shaped first connection sections 49.

Subsequently, the second housing 5 is inserted into the second hood section 89 of the support member 7 and then stored therein. At this time, the second engaging protrusions 59 and the second engaged portions 109 are engaged with each other, respectively, and the second housing 5 contacts the support wall 85, so that the second housing 5 and the support member 7 become movable together. Along with the contact of the support wall 85 and the second housing 5, the elastic tabs 27 are elastically deformed by being contacted with the second housing 5, and the engagements between the elastic tabs 27 and the engagement holes 103 are disengaged.

Next, the lever 9 is rotated from the rotational initial position to the rotational completion position. The rotation of lever 9 causes the cam pins 57 to move along the cam grooves 123, respectively, and the second housing 5 and support member 7 are moved toward the first housing 3. Along with the movement of the support member 7, the support wall 85 is moved from the temporary position to the completion position with respect to the first housing 3. As a result of this movement, the tab-shaped first connection sections 49 are inserted into the box-shaped second connection sections 81, respectively, and the first terminals 15 and the second terminals 17 are electrically connected, respectively. At this time, since the support wall 85 and the first hood section 87 are formed integrally with each other, no rattling occurs and the tab-shaped first connection sections 49 can be stably inserted into the box-shaped second connection sections 81, respectively.

In a state where the lever 9 is positioned in the rotational completion position, the detection member 13 is moved from the temporary-engagement position to the engagement-completion position. If the detection member 13 is not placed in the engagement-completion position, the lever 9 is rotated toward the rotational completion position and the detection member 13 is moved to the engagement-completion position again. When the detection member 13 is moved to the engagement-completion position, the lever locking portion 115 and the lever locked portion 129 are engaged with each other and the assembly of the connector 1 is completed.

The connector 1 according to the present embodiment includes the first housing 3 for storing the first terminals 15 having the tab-shaped first connection sections 49, respectively, and the second housing 5 for storing the second terminals 17 having the box-shaped second connection sections 81, respectively, into which the first connection sections 49 are to be inserted, respectively. The connector 1 also includes the support member 7 provided with the support wall 85 on which the insertion holes 91 are formed, into which the first connection sections 49 are to be inserted, respectively, and that is movable between the temporary position in which the first connection sections 49 are supported thereby and the completion position in which the first connection sections 49 are inserted into the second connection sections 81, respectively. The support member 7 is provided with the first hood section 87 into which the first housing 3 is to be inserted and the second hood section 89 into which the second housing 5 is to be inserted. The support wall 85 is integrally formed with the first hood section 87 and the second hood section 89 and partitions the first hood section 87 and the second hood section 89.

Since the support wall 85 is formed integrally with the first hood section 87 and the second hood section 89, when the support wall 85 moves between the temporary position and the completion position, the first hood section 87 and the second hood section 89 also move with the support wall 85. Therefore, no rattling occurs between the support wall 85 and the first hood section 87, and no misalignment occurs between the tab-shaped first connection sections 49 and the box-shaped second connection sections 81. Additionally, deformation and damage to the tab-shaped first connection sections 49 due to rattling can be prevented.

Therefore, in the connector 1 like this, the tab-shaped first connection sections 49 can be inserted stably into the box-shaped second connection sections 81, respectively, and their electrical connection reliability can be maintained.

In addition, the first engaging protrusions 25 are formed on the outer surface of the first housing 3, and the second engaging protrusion 59 are formed on the outer surface of the second housing 5. Furthermore, the first engaged portions 99 that are to be engaged with the first engaging protrusions 25, respectively, are formed on the inner surface of the first hood section 87, and the second engaged portions 109 that are to be engaged with the second engaging protrusions 59, respectively, are formed on the inner surface of the second hood section 89. The first housing 3 is held in the first hood section 87 by the engagements of the first engaged portions 99 with the first engaging protrusions 25. Similarly, the second housing 5 is held in the second hood section 89 by the engagements of the second engaged portions 109 and the second engaging protrusions 59. Furthermore, the first engaged portions 99 are formed at the ends of the first grooves 97, respectively, which are formed on the inner surface of the first hood section 87 along the movement direction of the support wall 85. The second engaged portions 109 are formed at the ends of the second grooves 107, respectively, which are formed on the inner surface of the second hood section 89 along the movement direction of the support wall 85. And, the opposite ends of the first grooves 97 to the first engaged portions 99 are open, and the opposite ends of the second grooves 107 to the second engaged portions 109 are also open.

When the ends of the first and second grooves 97 and 107 are opened in this manner, a portion of a molding die for the support member 7 can be pulled out when the molding die is opened. As a result, the structure of the molding die can be simplified, no cutting work nor no post-process is required and thus the moldability of the support member 7 can be improved.

Furthermore, the first housing 3 is provided with the elastic tabs 27 that is elastically deformable and extend toward the support wall 85. The engagement holes 103, through which the elastic tabs 27 are to be inserted and thus with which they are to be engaged, respectively, at the temporary position of the support wall 85 to hold the first housing 3 in the first hood section 87, are formed on the support wall 85. Furthermore, the elastic tabs 27 are configured to be contacted with the second housing 5 when the second housing 5 is inserted into the second hood section 89 and thus elastically deformed to be disengaged from the engagement holes 103 to allow the support wall 85 to move to the completion position.

Therefore, if the second housing 5 is not stored in the second hood section 89, the engagements between the elastic tabs 27 and the engagement holes 103 are not disengaged and the support wall 85 cannot be moved from the temporary position to the completion position. During the movement of the support wall 85 from the temporary position to the completion position, rattling due to disengagement of the elastic tabs 27 from the engagement holes 103 does not occur, and thus the tab-shaped first connection sections 49 can be stably supported by the support wall 85.

Although the present embodiment is described above, the present embodiment is not limited to the above, and various modifications can be made within the scope of the subject matter of the present embodiment.

For example, although the first housing and the second housing are made placed in close proximity to each other by rotating the lever in the present embodiment, not only this manner, but the first housing and the second housing may be made placed in close proximity to each other without the use of lever.

And, the first housing has the first frame and the first sub-housings, but is not limited to this. The first housing may be configured by forming the first frame and the first sub-housings as one piece. Similarly, the second housing may be configured by forming the second frame and the second sub-housings as one piece.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A connector comprising:

a first housing for storing a first terminal having a tab-shaped first connection section;

a second housing for storing a second terminal having a box-shaped second connection section, into which the first connection section is to be inserted; and a support member provided with a support wall on which an insertion hole is formed, into which the first connection section is to be inserted and that is movable between a temporary position in which the first connection section is supported thereby and a completion position in which the first connection section is inserted into the second connection section, wherein the support member is provided with a first hood section into which the first housing is to be inserted and a second hood section into which the second housing is to be inserted, wherein the support wall is integrally formed with the first hood section and the second hood section and partitions the first hood section and the second hood section, wherein a first engaging protrusion is formed on an outer surface of the first housing, and a second engaging protrusion is formed on an outer surface of the second housing, wherein a first engaged portion that is to be engaged with the first engaging protrusion is formed on an inner surface of the first hood section to hold first housing in the first hood section, and a second engaged portion that is to be engaged with the second engaging protrusion is formed on an inner surface of the second hood section to hold the second housing in the second hood section, wherein the first engaged portion is formed at an end of a first groove formed on the inner surface of the first hood section along a movement direction of the support wall, and the second engaged portion is formed at an end of a second groove formed on the inner surface of the second hood section along the movement direction of the support wall, and wherein an opposite end of the first groove to the first engaged portion is open, and an opposite end of the second groove to the second engaged portion is also open.

2. The connector according to claim 1, wherein the first housing is provided with an elastic tab that is elastically deformable and extends toward the support wall, wherein an engagement hole is formed on the support wall, the elastic tab being to be inserted into the engagement hole and thus engaged with the engagement hole at the temporary position of the support wall to hold the first housing in the first hood section, and the elastic tab is configured to be contacted with the second housing when the second housing is inserted into the second hood section and thus elastically deformed to be disengaged from the engagement hole to allow the support wall to move to the completion position.

* * * * *